J. GRIFFEN & M. P. WEEKS,
S. E. WEEKS, Adm'x., of M. P. WEEKS, dec'd., J. GRIFFEN and S. E. WEEKS assignors to RIVERSIDE IRON WORKS.
Piling Old Railroad-Rails.
No. 8,770. Reissued June 24, 1879.
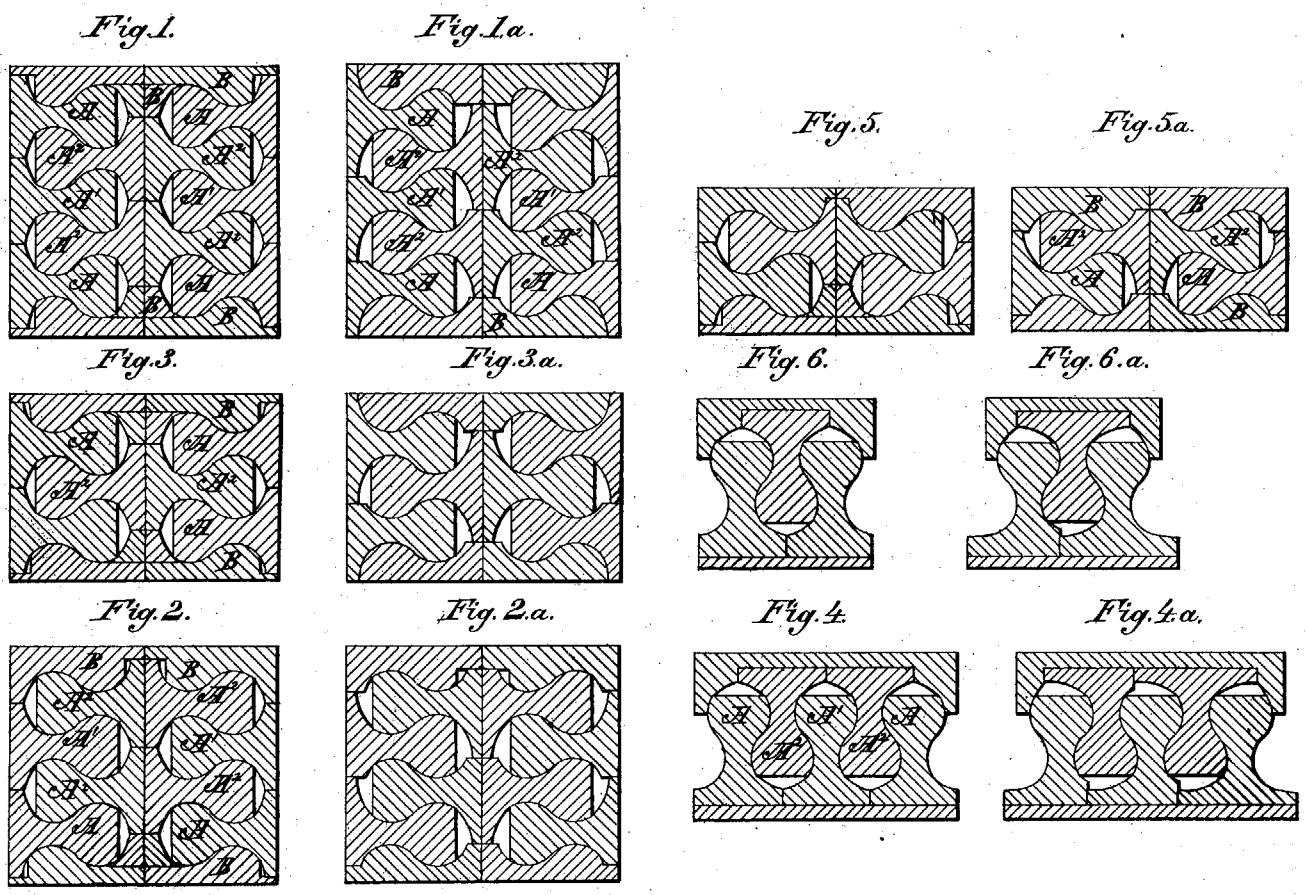
*Attest:*
F. H. Schitt.
Geo. T. Brereton
*Inventors:*
John Griffen
Susan E. Weeks
Per Wm. H. Brereton, Adm'r, Atty
N. PETERS, PHOTO-LITHOGRAPHER, WASHINGTON, D. C.

UNITED STATES PATENT OFFICE.

JOHN GRIFFEN, OF PHŒNIXVILLE, AND SUSAN E. WEEKS, (ADMINISTRATRIX OF MICAJAH P. WEEKS, DECEASED,) OF MILLERSVILLE, PENNSYLVANIA, ASSIGNORS TO RIVERSIDE IRON WORKS, OF WHEELING, W. VA.

IMPROVEMENT IN PILING OLD RAILROAD-RAILS.

Specification forming part of Letters Patent No. 42,656, dated May 10, 1864; Reissue No. 8,770, dated June 24, 1879; application filed December 20, 1878.

*To all whom it may concern:*

Be it known that JOHN GRIFFEN, of Phœnixville, Pennsylvania, and MICAJAH P. WEEKS, both formerly of Buffalo, in the county of Erie and State of New York, did invent certain new and useful Improvements in Piling Old Railroad-Rails; and we do hereby declare that the following is a full, clear, and exact description of the invention, that will enable others skilled in the art to which it appertains to make and use the same, reference being had to the accompanying drawings, and to the letters of reference marked thereon, which form a part of this specification.

The invention relates to piles for reworking old railroad-rails; and the said invention consists, first, in so shearing off longitudinally a portion of the flange or flanges of the old rails for reworking that they may be arranged or interlocked together in a manner to form a compact and solid pile which will admit of being rolled into new rails or other bar or plate iron at one heating; second, in the combination, with the pile of rails as sheared and interlocked, of special pieces of proper form or forms to fill out or square the pile; third, in side bars or special pieces of such form as to adapt them to conform to the sides of the pile, however the pile may be arranged or whatever its construction; fourth, in forming a pile of a top and bottom series of interlocking rails with top and bottom protecting plates, all as and for the purposes hereinafter more fully set forth and claimed.

Referring to the drawings, Figure 1 represents a cross-section of a pile consisting of ten rails, A $A^1$ $A^2$, and special pieces B B. In this arrangement of the rails the sides of the pile are formed by three rails, A $A^1$ A, with their flanges vertical and in contact, and bases outward and flush. The flanges being sheared so that the width of the base only exceeds the width of the head by the thickness of the web, the space between two adjacent rails, A $A^1$, will be of such size and shape as to be filled by a third, rail, $A^2$, interlocking therewith. The interlocking rails $A^2$ are placed base to base, so that the width of the pile is equal to twice the depth of the rails plus twice the depth of the base or flange. The special pieces B are rolled in one, two, or three parts, with one side flat and the other of such form as to fit into and fill the curved surface formed by the sides of the bottom and top rails A of the pile, so that the pile is evened or squared up in proper form for passage through the forming-rollers. These special pieces are adapted to conform to the curve of the rail, however the pile may be formed, and may be of equal or less width than the pile, so long as its squaring or forming, shielding, and protecting function is the same. In effecting these stated functions, the side bars or special pieces may have angular side laps adapted to variously-formed piles, as shown in Figs. 4, $4^a$, 6, and $6^a$. It is therefore obvious that the invention is not confined to any specific form of pile or special form of side bars, as the several modified forms of pile of the drawings show. This pile is compact and solid, without interstices, so that in its first passage between the forming-rollers, and while it is at the proper welding-temperature, and before it has time to cool, a perfect and complete welding takes place between all of the different rails forming the pile, so that the new rail may be formed complete and perfect without the necessity of reheating.

In rails constructed with rounded-off flanges, the flanges of two such rails, when placed in contact without shearing, would only slightly touch each other, and, consequently, would allow the cold air to enter between them, which, on account of the comparatively small quantity of metal at that point, cools them before they can be passed through the forming-rollers, thus preventing a perfect weld and causing the necessity of reheating. By shearing the flanges according to our improvement this difficulty is entirely overcome, since the shearing cuts off the rounded edge of the flange and gives a much greater and more perfect bearing to the flanges in contact. By reference to the piles shown in Figs. $1^a$, $3^a$, $4^a$, and $6^a$, it will be seen that it is not the intention, nor is it necessary, that all the flanges of all the rails forming the pile be sheared, this shearing or cutting off of the flange or flanges only being resorted to whenever desirable, in order to form a compact and solid pile; and in case it is found that the rails will pile compactly without shearing at all, it may be entirely dispensed with. This would be the result in case rails constructed with square flanges were employed in the construction of the pile, as the flanges of two such rails when placed together would give all the bearing desirable.

In some instances, when the flanges of the rail are round or broken, it may be sheared either on one or both sides; but, as shown in the drawings, the functions of the side bars are not dependent upon the shearing of the flanges.

Fig. 2 represents a pile formed of eight rails, sheared, arranged, and interlocked as in Fig. 1, with a change in the form of the top special piece, as represented.

Fig. 3 represents a pile formed of six rails, sheared, arranged, and interlocked as in Fig. 1, the special pieces being the same as in Fig. 1.

Fig. 4 represents a pile consisting of five rails, the first course of which is formed by three rails standing upon their bases, and the second course of two rails, filling the spaces between the rails of the first course and interlocking therewith. The lower special piece is simply a flat bar of proper width, the upper one having one side flat and the other of proper form to fit the top of the pile.

Fig. 5 represents a pile formed of four rails, arranged and interlocked as in Fig. 1, the lower special piece being the same as in Fig. 1, and the upper the same as in Fig. 2.

Fig. 6 represents a pile consisting of three rails, arranged as in Fig. 4, with special pieces of the same form.

Fig. $1^a$ is a pile arranged the same, and consisting of the same number of rails as Fig. 1, except that, instead of shearing an equal quantity from each flange of the rail, a quantity equal to that sheared from both flanges is sheared from one, which allows the rails to interlock and form a solid and compact pile, the same as in Fig. 1.

Figs. $2^a$, $3^a$, $4^a$, $5^a$, $6^a$ represent piles arranged the same, and consisting of the same number of rails as Figs. 2, 3, 4, 5, and 6, except that, as described for Fig. $1^a$, one flange only is sheared.

Having thus described the invention, what we claim as new, and desire to secure by Letters Patent, is—

1. A pile or fagot of rails whose flange or flanges have previously been sheared off, substantially as described, for the purpose set forth.

2. The combination, with a pile of rails so sheared and interlocked, of extra or special pieces of proper form or forms to fill out or square the pile, substantially as set forth.

3. In a pile of old rails, a side bar or special piece of proper form to fill out or square the pile, substantially as shown and described.

4. In a pile of old rails, a side bar or special piece made flat on one side, and so formed on the other as to substantially conform to the shape of the pile, to fill out or square the same and protect the rail flange and head.

5. The improved pile of old rails, composed of top and bottom plates or special pieces and a top and bottom series of interlocking rails, substantially as and for the purpose described.

In testimony that we claim the foregoing we have hereunto set our hands this 12th day of October, 1878.

JOHN GRIFFEN.
SUSAN E. WEEKS,
*Administratrix of M. P. Weeks, deceased.*

Witnesses:
S. D. HUNTER,
ALLAN A. HERN.